(12) United States Patent
Serrano et al.

(10) Patent No.: US 8,533,204 B2
(45) Date of Patent: Sep. 10, 2013

(54) TEXT-BASED SEARCHING OF IMAGE DATA

(75) Inventors: Jose Antonio Rodriquez Serrano, Grenoble (FR); Florent Perronnin, Domene (FR); Craig John Saunders, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/224,373

(22) Filed: Sep. 2, 2011

(65) Prior Publication Data
US 2013/0060786 A1    Mar. 7, 2013

(51) Int. Cl.
*G06F 7/00*    (2006.01)
(52) U.S. Cl.
USPC .......................................................... 707/749
(58) Field of Classification Search
USPC ................. 707/705, 748, 758, 999.104, 749, 707/999.107; 382/128, 279, 118
See application file for complete search history.

(56) References Cited

U.S. PATENT DOCUMENTS

| | | | |
|---|---|---|---|
| 5,568,406 A | 10/1996 | Gerber | |
| 5,852,823 A * | 12/1998 | De Bonet | 382/279 |
| 6,433,706 B1 | 8/2002 | Anderson, III et al. | |
| 7,737,837 B2 | 6/2010 | Donovan et al. | |
| 2007/0008179 A1* | 1/2007 | Hedley et al. | 340/928 |
| 2007/0160275 A1* | 7/2007 | Sathyanarayana | 382/128 |
| 2007/0271226 A1* | 11/2007 | Zhang et al. | 707/3 |
| 2009/0060396 A1 | 3/2009 | Blessan et al. | |
| 2009/0180695 A1 | 7/2009 | Rodriguez Serrano et al. | |
| 2009/0204637 A1* | 8/2009 | Li et al. | 707/104.1 |
| 2010/0082615 A1 | 4/2010 | Clinchant et al. | |
| 2011/0038512 A1* | 2/2011 | Petrou et al. | 382/118 |
| 2012/0011142 A1* | 1/2012 | Baheti et al. | 707/769 |
| 2012/0062732 A1* | 3/2012 | Marman et al. | 348/142 |
| 2012/0078955 A1* | 3/2012 | Boguraev et al. | 707/769 |
| 2012/0109943 A1* | 5/2012 | Yang et al. | 707/723 |

OTHER PUBLICATIONS

Jain, et al. "Unsupervised texture segmentation using gabor filters," *Pattern Recogn.*, 24(12):1167-1186, 1991.
Jain, et al. "Object detection using gabor filters," *Pattern Recognition*, 30:295-309, 1997.
Ke, et al. "The design of high-level features for photo quality assessment," vol. 1, pp. 419-426, Jun. 2006.
Luo. "A training-based no-reference image quality assessment algorithm," vol. 5, pp. 2973-2976, Oct. 2004.
Luo, et al. "Photo and video quality evaluation: Focusing on the subject," in *ECCV* (3), pp. 386-399, 2008.
Lyons, et al. "Coding facial expressions with gabor wavelets," in *FG '98: Proceedings of the 3rd. International Conference on Face & Gesture Recognition*, p. 200, 1998.

(Continued)

*Primary Examiner* — Hung T Vy
(74) *Attorney, Agent, or Firm* — Fay Sharpe LLP (57) ABSTRACT

A method and system are disclosed for conducting text-based searches of images using a visual signature associated with each image. A measure of string similarity between a query and an annotation associated with each entry in a first database is computed, and based upon the computed string similarity measures, a set of entries from the first database is selected. Each entry of the first database also includes an associated visual signature. At least one entry is then retrieved from a second database based upon a measure of visual similarity between a visual signature of each of the entries in the second database and the visual signatures of the entries in the selected set. Information corresponding to the retrieved entries from the second database is then generated.

24 Claims, 5 Drawing Sheets

(56) References Cited

OTHER PUBLICATIONS

Datta, et al. "Algorithmic inferencing of aesthetics and emotion in natural images: An exposition," pp. 105-108, Oct. 2008.
Sheikh, et al. "A statistical evaluation of recent full reference image quality assessment algorithms," *IEEE Transactions on Image Processing*, 15(11), 3440-3451, Mar. 2006.
Chang, et al. "LIBSVM: a library for support vector machines," 2001.
Datta, et al. "Studying aesthetics in photographic images using a computational approach," in European Conference on Computer Vision 2006 ( ECCV ), pp. 288-301.
Datta, et al. "Learning the consensus on visual quality for next-generation image management," in MULTIMEDIA '07: Proceedings of the 15th international conference on Multimedia, pp. 533-536, 2007.
Datta, et al. "Acquine: aesthetic quality inference engine—real-time automatic rating of photo aesthetics," in *Multimedia Information Retrieval*, pp. 421-424, 2010.
Bhattacharya, et al. "Framework for photo-quality assessment and enhancement based on visual aesthetics," ACM Multimedia, Oct 25-29, 2010.
Wang, et al. "Objective Video Quality Assessment," in *The handbook of video databases: design and applications*, Chapter 41, pp. 1041-1078. CRC press, 2003.
Perronnin, et al., "Fisher Kernels on Visual Vocabularies for Image Categorization," in Proc. of the IEEE Conf on Computer Vision and Pattern Recognition (CVPR), Jun. 2007.
Zheng, et al., "Tour the World: Building a web-scale landmark recognition engine," IEEE Computer Society Conference, 2009.
Jegou, et al., "Improving Bag-Of-Features for Large Scale Image Search," in IJCV, 2010.
Csurka, et al., "Visual Categorization with Bags of Keypoints," ECCV *Workshop on Statistical Learning in Computer Vision*, 2004.
Jegou, et al., "Hamming embedding and weak geometric consistency for large scale image search," in ECCV 2008.
Laaksonen, et al., "PicSOM self-organizing image retrieval with MPEG-7 content descriptions," IEEE Transactions on Neural Networks, vol. 13, No. 4, 2002.
Ballard. "Generalizing the hough transform to detect arbitrary shapes," in M. A. Fischler and O. Firschein, editors, *Readings in Computer Vision: Issues, Problems, Principles, and Paradigms*, pp. 714-725, 1987.
Everingham, et al. "The PASCAL Visual Object Classes Challenge," VOC 2008 Results.
Farquhar, et al. "Improving 'Bag-of-keypoints' image categorization. Technical report," University of Southampton, 2005.
Hsu, et al. "Blurred image detection and classification," in *MMM*, 2008.
Jaakkola, et al. "Exploiting generative models in discriminative classifiers," in *NIPS*, 1999.
Krishnapuram, et al. "Sparse multinomial logistic regression: Fast algorithms and generalization bounds" *IEEE TPAMI*, 2005.
Lazebnik, et al. "Beyond bags of features: Spatial pyramid matching for recognizing natural scene categories," in *CVPR*, 2006.
Levin. "Blind motion deblurring using image statistics," in *NIPS*, 2006.
Li, et al. "Aesthetic quality assessment of consumer photos with faces," *ICIP*, 2010.
Liu, et al. "A similarity measure between unordered vector sets with application to image categorization," in *CVPR*, 2008.
Lowe. "Distinctive image features from scale-invariant keypoints," *IJCV*, 2004.
Rubner, et al. The earth mover's distance as a metric for image retrieval. *IJCV*, 2000.
Sivic, et al., "Video Google: A text retrieval approach to object matching in videos," In *ICCV*, 2003.
Tai, et al. "Detail recovery for single-image defocus blur," *IPSF Trans. on Computer Vision and Applications*, 2009.
Tong. "Blur detection for digital images using wavelet transform," *in Proceedings of IEEE International Conference on Multimedia and Expo*, pp. 17-20, 2004.
Obrador, et al. "The role of image composition in image aesthetics," Sep. 26-29, 2010.
Perronnin, et al. "Large-scale image retrieval with compressed fisher vectors," in *CVPR*, 2010.
Perronnin, et al. "Improving the fisher kernel for large-scale image classification," in *ECCV*, 2010.
Mikolajczyk, et al. "A Performance Evaluation of Local Descriptors," Proceedings of the Conference on Computer Vision and Pattern Recognition (CVPR), Jun. 2003.
European Search Report for Application No. EP 12 18 1281; Date of completion of the search: Dec. 13, 2012; Place of search: The Hague.
Xin-Jing Wang et al.: "Annotating Images by Mining Image Search Results", IEEE Transactions on Pattern Analysis and Machine Intelligence, IEEE Service Center, Los Alamitos, CA, US, vol. 30, No. 11, Nov. 1, 2008, pp. 1919-1932, XP011292617, ISSN: 0162-8828.
Bereciartua A. et al.: "A new semantic text-image search engine for car designers", Content-Based Multimedia Indexing, 2008. CBMI 2008. International Workshop on, IEEE, Piscataway, NJ, USA, Jun. 18, 2008, pp. 584-591, XP031286418, ISBN: 978-1-4244-2043-8.
Rob G. J. Wijnhoven et al.: "Identity verification using computer vision for automatic garage door opening", IEEE Transactions on Consumer Electronics, IEEE Service Center, New York, NY, US, vol. 57, No. 2, May 1, 2011, pp. 906-914, XP011335731, ISSN: 0098-3063, DOI: 10.1109/TCE.2011.5955239.

\* cited by examiner

TEXT-BASED SEARCHING OF IMAGE DATA

BACKGROUND

The following relates to the image classification arts, object classification arts, and so forth.

In many circumstances, particularly in traffic management, surveillance and tracking, one or more cameras are available for recording images related to vehicles, people, documents, and the like. This capturing of images does not always lend itself to optical character recognition operations, as such operations require sufficient resolutions, are prone to transcription errors, and are expensive to implement. In addition, use of existing cameras may not provide the resolution necessary for proper optical character recognition, as such cameras do not provide sufficient image clarity for text recognition to occur. For example, a city street corner may have existing traffic cameras, which routinely capture images of vehicles transiting an intersection. These images are stored in a database accessible by law enforcement to locate a stolen vehicle, but are not readily searchable by license plate number because the quality of image is not sufficient for optical character recognition to be performed. Law enforcement must then view each image in the database to manually scan for a license plate that matches the number of the vehicle being sought.

Optical character recognition does not impose strenuous demands on processing or time constraints on recognition operations. However, some instances may reflect substantial diversity amongst representative samples, e.g., recognition of driving licenses, identification forms, license plates, and the like. For example, license plates vary among states, while some states have multiple versions of plates, each with different graphics, text placement, fonts, and slogans. Similarly, each state or agency has its own version of identification, including text placement, hologram placement, fonts, slogans, and the like. In such circumstances, optical character recognition may require a high resolution image for analysis due to the large amount of competing indicia on the license plate or driver's license.

INCORPORATION BY REFERENCE

The following references, the disclosures of which are incorporated herein by reference in their entireties, are mentioned:

1. Jorge Sanchez, et al., U.S. application Ser. No. 12/890,789, filed Sep. 27, 2010, entitled IMAGE CLASSIFICATION EMPLOYING IMAGE VECTORS COMPRESSED USING VECTOR QUANTIZATION, discloses a method for generating an image vector of an image for classification of large datasets. The method begins with the extraction of local descriptors from an image and generating an image vector with vector elements that are indicative of parameters of mixture model components (which represent the extracted descriptors). The vector is compressed, resulting in a multiple sub-vectors, each have at least two vector elements, which are then compressed and concatenated to generate a compressed vector. The image is then classified based on the compressed vector.

2. Jose A. Rodriguez Serrano, et al., U.S. Pub. No. 2009/0180695 published Jul. 16, 2009, and entitled ASYMMETRIC SCORE NORMALIZATION FOR HANDWRITTEN WORD SPOTTING SYSTEM, discloses a method that begins by receiving an image of a handwritten item. The method performs a word segmentation process on the image to produce a sub-image and extracts a set of feature vectors from the sub-image. Then, the method performs an asymmetric approach that computes a first log-likelihood score of the feature vectors using a word model having a first structure (such as one including a Hidden Markov Model (HMM)) and also computes a second log-likelihood score of the feature vectors using a background model having a second structure (such as one including a Gaussian Mixture Model (GMM)). The method computes a final score for the sub-image by subtracting the second log-likelihood score from the first log-likelihood score. The final score is then compared against a predetermined standard to produce a word identification result and the word identification result is output.

3. Stephane Clinchant, et al., U.S. Pub. No. 20100082615, published Apr. 1, 2010, and entitled CROSS-MEDIA SIMILARITY MEASURES THROUGH TRANS-MEDIA PSEUDO-RELEVANCE FEEDBACK AND DOCUMENT RE-RANKING, discloses a method for multi-modal information retrieval by querying a dataset with one modality, e.g., text. The most similar examples for the database in this modality are retrieved, and then the same database is re-queried using those examples with a different modality, e.g., images. This enables text-to-image searches for images that do not have any associated text data. That is, queries obtained with the first modality are used to re-query in the same database with a different modality, so as to provide pseudo-relevance feedback during the querying.

4. Marco Bressan, et al., U.S. Pub. No. 20090060396, published Mar. 5, 2009, and entitled FEATURES GENERATION AND SPOTTING METHODS AND SYSTEMS USING SAME, discloses a method for spotting words in documents through segmentation of an input image. A partition point that divides an input image into four sub-images each having a pre-selected activated pixel count is first located. This finding is then recursively repeated for the four sub-images one or more times to generate multiple partition points. The input image is then classified based in part on the generated partition point. The method provides for identifying words or signatures based on the partition point as well as certain other features, e.g., activated pixels, coordinates of the partition points, and the like.

5. Florent Perronnin, et al., U.S. application Ser. No. 12/859,898 filed Aug. 20, 2010, and entitled LARGE SCALE IMAGE CLASSIFICATION, discloses a method for classifying images using a Fisher kernel framework. Image signatures including the Fisher Vector of the image are used in conjunction with linear classifiers to assign one or more labels to an image based upon the semantic content of the image. To classify in accordance with the method, an input image representation is generated based upon an aggregation of local descriptors that are extracted from the underlying input image. The representation is then adjusted by performing a power-based or logarithmic-based scarcity reduction operation.

BRIEF DESCRIPTION

In one aspect of the exemplary embodiment, a method for text-based searching of image data includes computing, with a computer processor, a measure of string similarity between a query and an annotation associated with each entry in a first database, and based upon the computed string similarity measures, selecting a set entries from the associated first database. Each entry of the first database also includes a visual signature associated therewith. The method further includes retrieving at least one entry from a second database based upon a measure of visual similarity between a visual signature of each of the entries in the second database and the visual signatures of the entries in the selected set. The method also includes generating information corresponding to at least one of the retrieved entries.

In another aspect, a system for text-based image searching includes a processor with access to associated memory. The associated memory stores a first associated database that includes a plurality of annotated entries, each entry having a visual signature and annotation associated therewith. The associated memory also stores a second associated database that includes a plurality of entries, each entry having a visual signature associated therewith. The system also includes memory in communication with the processor, which stores instructions which are executed by the processor for receiving a query which includes a character string. The instructions are also for computing a string similarity measure between the query character string and an annotation associated with each of the entries in the first database, and based on the computed string similarity measures, selecting a set of the entries from the associated first database, a visual signature being associated with each entry. The instructions include instructions for retrieving at least one entry from the second database, based on a computed visual similarity measure which is based on visual signatures of each of the entries in the second database and the visual signatures of the entries in the selected set from the associated first database. In addition, the instructions include instructions for outputting information corresponding to at least one of the retrieved entries.

In another aspect, a method for text-based searching of image data includes receiving a query into memory, the query including a character string, each of the characters in the string selected form a finite set of characters. The method also includes calculating, with a computer processor, a string similarity measure between the character string of the query and an annotation associated with each visual signature of each captured image stored in a first database. The annotation includes a character string, with each of the characters in the string selected from the finite set of characters. The method also includes selecting a first set of visual signatures from the visual signatures in the first database based on the computed string similarity measures, and retrieving a set of images from the second database based on a computed measure of similarity between the visual signatures in the first set of visual signatures and visual signatures of images in the second database.

DETAILED DESCRIPTION

One or more implementations of the subject application will now be described with reference to the attached drawings, wherein like reference numerals are used to refer to like elements throughout. Aspects of exemplary embodiments related to systems and methods for enabling text-based searching of image data without the use of optical character recognition.

Figure 1:
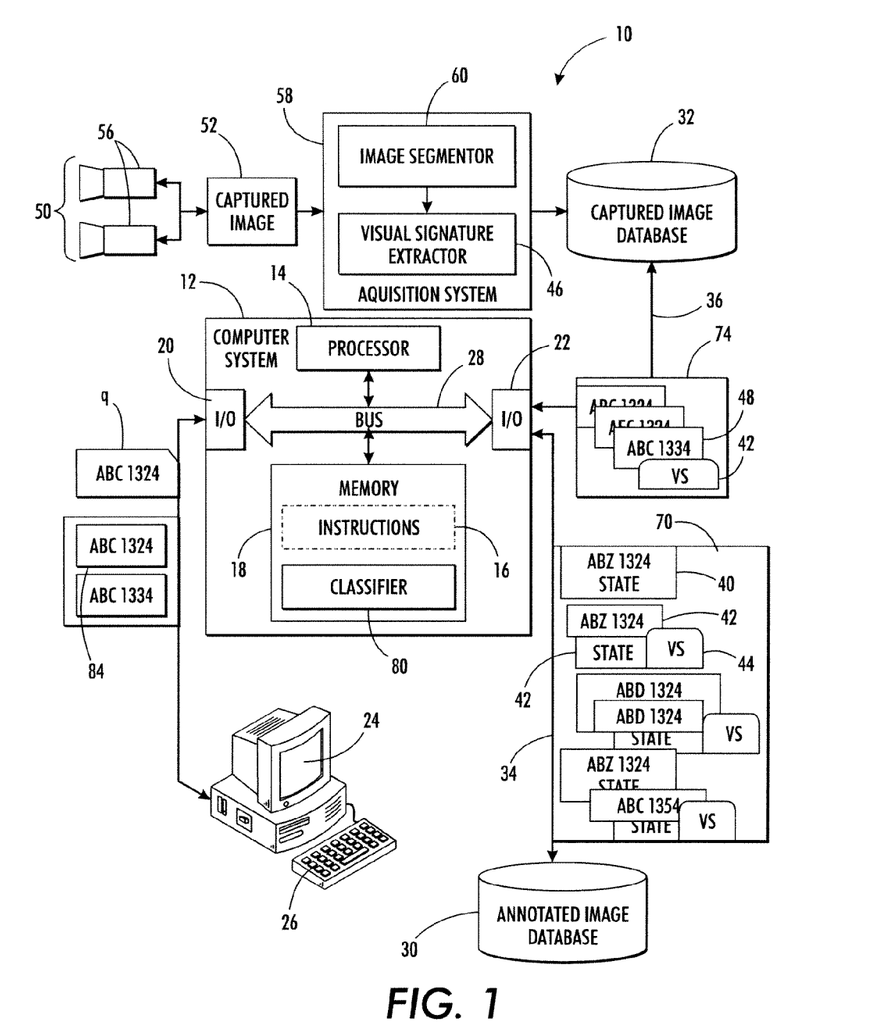
FIG. 1 diagrammatically shows a system for text-based searching of image data.

Referring now to FIG. 1, there is shown an exemplary searching system 10 upon which one embodiment of the subject application is capable of being implemented. It will be appreciated that the various components depicted in FIG. 1 are for purposes of illustrating aspects of the subject application, and that other similar components, implemented via hardware, software, or a combination thereof, are capable of being substituted therein.

It will be appreciated that the searching system 10 is capable of implementation using a distributed computing environment, such as a computer network, which is representative of any distributed communications system known in the art capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network is comprised of physical layers and transport layers, as illustrated by the myriad of conventional data transport mechanisms, such as, for example and without limitation, Token-Ring, Ethernet, or other wireless or wire-based data communication mechanisms. Furthermore, those skilled in the art will appreciate that while depicted in FIG. 1 as a networked set of components, the subject system and method are capable of implementation on a stand-alone device adapted to perform the methods described herein.

As shown in FIG. 1, the searching system 10 includes a computer system 12, which is capable of implementing the exemplary method described below. The computer system 12 may include a computer server, workstation, personal computer, combination thereof, or any other computing device.

According to one example embodiment, the computer system 12 includes hardware, software, and/or any suitable combination thereof, configured to interact with an associated user, a networked device, networked storage, remote devices, or the like. The exemplary computer system 12 includes a processor 14, which performs the exemplary method by execution of processing instructions 16 which are stored in memory 18 connected to the processor 14, as well as controlling the overall operation of the computer system 12. Computer system 12 also includes one or more interface devices 20, 22 for communicating with external devices. The I/O interface 20 may communicate with one or more of a display device 24, for displaying information to users, such as retrieved license plate images, and a user input device 26, such as a keyboard or touch or writable screen, for inputting text, and/or a cursor control device, such as mouse, trackball, or the like, for communicating user input information and command selections to the processor 14. The various components of the computer system 12 may be all connected by a data/control bus 28. The processor 14 of the computer system 12 is in communication with a first annotated database 30 and a second database 32 via links 34, 36. Suitable communications links 34, 36 may include, for example, the public switched telephone network, a proprietary communications network, infrared, optical, or any other suitable wired or wireless data transmission communications known in the art. The databases 30 and 32 are capable of implementation on components of the computer system 12, e.g., stored in local memory 18, e.g., on hard drives, virtual drives, or the like. In addition, the components of the system 10 are capable of being dispersed via a network (not shown), and are illustrated proximally in FIG. 1 for example purposes.

The computer system 12 may be a general or specific purpose computer, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 18 may represent any type of non-transitory computer readable medium such as random access memory (RAM), read only memory (ROM), magnetic disk or tape, optical disk, flash memory, or holographic memory. In one embodiment, the memory 18 comprises a combination of random access memory and read only memory. In some embodiments, the processor 14 and memory 18 may be combined in a single chip. The network interface(s) 20, 22 allow the computer to communicate with other devices via a computer network, and may comprise a modulator/demodulator (MODEM). Memory 18 may store data the processed in the method as well as the instructions for performing the exemplary method.

The digital processor 14 can be variously embodied, such as by a single-core processor, a dual-core processor (or more generally by a multiple-core processor), a digital processor and cooperating math coprocessor, a digital controller, or the like. The digital processor 14, in addition to controlling the operation of the computer 12, executes instructions stored in memory 18 for performing the method outlined in FIGS. 2 and 3.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The associated first database 30, also referenced as the annotated database, and the second database 32 correspond to any organized collections of data (e.g., images) for one or more purposes. Implementation of the associated first database 30 and second database 32 are capable of occurring on any mass storage devices known in the art including, for example, magnetic storage drives, a hard disk drive, optical storage devices, flash memory devices, or any suitable combination thereof. In one embodiment, the databases 30 and 32 are implemented as virtual components of a shared device. It will be appreciated that while illustrated in FIG. 1 as being a separate components of the system 100, the first database 30 and the second database 32 are capable of being implemented on internal storage components of the computer system 12, such as, for example an internal hard disk drive of memory 18, or the like.

In one embodiment, the first database 30 includes a collection of images 40 and visual signatures 42 of objects of interest, e.g., one or more of license plates, driver licenses, governmental IDs, and the like. For example, in the example embodiment of license plates, the first database 30 includes images 40 and annotations 44 associated with the image corresponding to a license plate, e.g., license plate number, issuing state, date/time of image, location of vehicle, etc. The annotation may have been manually entered, e.g., by a user viewing the images to be annotated. The characters are drawn from a finite set of characters, e.g., alphanumeric characters in the case of license plates. The annotation, in the case of a license plate, can thus be an alphanumeric string of characters corresponding to the characters visible on the license plate image 40, as well as characters representative of the state issuing the license plate or other identifiable text or indicia on the plate, e.g., slogans, mottoes, counties, expiration dates, or the like. By alphanumeric, it is meant letters and/or numbers. The finite set of characters may thus include at least 5 or at least 10 different characters, e.g., up to 100 different characters, and in some cases, up to 40 characters. The annotation string may include at least 2 or at least 3 characters and generally at least four or at least five characters, e.g., up to about 30 characters, and in some cases, up to 10 characters. In some embodiments, spaces between characters are ignored in the annotation, so that, for example, the number plate "ABC 1234" is represented as ABC1234.

The visual signature 44 can be extracted, e.g., by a visual signature extractor 46 implemented as software executed by a suitable processor, such as processor 14 or by a separate processor. Once the visual signature 44 has been extracted and the annotation 42 has been generated, it is no longer necessary to store the images themselves in database 30. Thus, each entry in the database 30 may include a visual signature 44 and a corresponding annotation 42 for a respective image.

The visual signature 42 associated with each image is representative of a fixed-length set of informative values that characterizes the image. In one example embodiment, the visual signature 44 of each image is implemented as a Fisher Vector of the image, as discussed in greater detail below. It will be appreciated that other types of images and corresponding annotations are equally capable of being implemented. Thus, the methods disclosed herein may be applied to photo identifications, where an image of a photo ID is taken, annotation is performed such that identifying labels are associated in the database with the image.

The second database 32 includes images 48 captured by an associated image capture system 50, visual signatures 44 corresponding to such captured images, and may further include any additional information available at the time the image is captured, e.g., time of capture, camera identifier, geographical location of the area covered by the camera, and the like. The second database 32 can be implemented as a static or dynamic database (e.g., keeping only a buffer of the most recent images of vehicles). For example purposes, the subject application denotes $x_j$ the jth entry of the database 32, with j=1, . . . , N and with N being the number of entries in the associated second database 32.

As illustrated in FIG. 1, the image capture system 50 in data communication with the second database 32 is capable of capturing an image 52 of a specified object, e.g., a vehicle, license plate, driver's license, or the like. The image 52 corresponds to a digital image that may be variously generated, for example by a digital camera 56, or by a film-based camera whose photograph is scanned by an optical scanner to generate a digital image, or by a drawing application program, graphical art program, or other application program that outputs a bitmapped or pixmapped image, or the like. The image capture system 50 depicted in FIG. 1 is representative of any image capture system including, for example, traffic camera systems, CCTV systems, surveillance cameras, toll-booth cameras, still digital cameras, video cameras, scanners, and the like. In one embodiment, the image capture system 50 includes one or more cameras 56, as well as an acquisition system 58, which receives as input the captured images 52 and generates the images 48 therefrom. The exemplary acquisition system 58 includes an image segmentation component 60 for segmenting the image to identify the object of interest, here the license plate, and extract a cropped image 48 which includes the identified object, as well as the visual signature generation component 46. Components 46, 60 are implemented in hardware, software, or a combination thereof, e.g., in the form of instructions stored in memory executed by a processor, analogous to memory 18 and processor 14.

The visual signatures 44 of the captured and segmented images 48 as well as of the annotated images 40 may be generated by the image capture device or by software stored elsewhere, such as in the memory 18 of computer system 12.

The exemplary visual signatures 44 are vectorial representations, which can be of a fixed length and which are derived by computing, for each of one or more low-level local feature types, a set of statistics for patches of the image 40, 48, and then aggregating these statistics into an image-level representation which is referred to herein as a visual signature.

Prior to extraction of low level features, the image 40, 48 may be partitioned into regions at multiple scales. Then, for each region (or for the entire image or a selected portion thereof), a set of patches is extracted, which can also be at multiple scales. For each patch, low-level features (in the form of a local descriptor) are extracted. A visual signature of the image is then generated, based on the extracted local descriptors. The image is thus described by a representation which is based on statistics generated for the small patches of the image.

The patches can be obtained by image segmentation, by applying specific interest point detectors, by considering a regular grid, or simply by random sampling of image patches. For example, at least about 100 patches are extracted from each region. More generally, over the image as a whole, at least 1000 and in some cases, at least 10,000 patches may be extracted. The number of patches can be up to 100,000 or more, depending on the size of the image file.

The low level features which are extracted from the patches are typically quantitative values that summarize or characterize aspects of the respective patch, such as spatial frequency content, an average intensity, color characteristics (in the case of color images), gradient values, and/or other characteristic values. In some embodiments, at least about fifty low level features are extracted from each patch; however, the number of features that can be extracted is not limited to any particular number or type of features for example, 1000, 10,000, or 100,000 low level features could be extracted depending on computational capabilities. In the exemplary embodiment, the low level features include local (e.g., pixel) color statistics, and texture. For color statistics, local RGB statistics (e.g., mean and standard deviation) may be computed. For texture, gradient orientations (representing a change in color) may be computed for each patch as a histogram to generate gradient feature descriptors, such as Scale Invariant Feature Transform (SIFT) descriptors (SIFT-like features). In the exemplary embodiment two (or more) types of low level features, such as color and texture, are separately extracted and the high level representation of the patch or image is based on a combination (e.g., a sum or a concatenation) of two descriptors, one for each feature type.

In the exemplary embodiment, SIFT descriptors, as described by Lowe, in "Object Recognition From Local Scale-Invariant Features," International Conference on Computer Vision (ICCV), 1999, are computed on each patch. SIFT descriptors are multi-image representations of an image neighborhood, such as Gaussian derivatives computed at, for example, eight orientation planes over a four-by-four grid of spatial locations, giving a 128-dimensional vector (that is, 128 features per features vector in these embodiments). Other descriptors or feature extraction algorithms may be employed to extract features from the patches. Examples of some other suitable descriptors are set forth by K. Mikolajczyk and C. Schmid, in "A Performance Evaluation Of Local Descriptors," Proceedings of the Conference on Computer Vision and Pattern Recognition (CVPR), Madison, Wis., USA, June 2003, which is incorporated in its entirety by reference.

In one illustrative example employing SIFT features, the features are extracted from 32×32 pixel patches on regular grids (every 16 pixels) at five scales, to provide 128 dimensional SIFT descriptors. Other suitable features include simple 96-dimensional color features in which a patch is subdivided into 4×4 sub-regions and in each sub-region the mean and standard deviation are computed for the three R, G and B channels. The number of features is optionally reduced, e.g. to 64 dimensions, using Principal Component Analysis (PCA).

For each type of low-level local feature, a set of statistics is computed for each patch in the form of a local descriptor. The statistics are aggregated to generate a region level or image-level representation. For computational efficiency reasons, two techniques for generating image representations which model the distribution of feature sets using fixed-length vectorial representations can be employed: the bag-of-visual-words (BOV) and the Fisher vector (FV).

In one embodiment, the visual signatures are implemented as the Fisher vector that is calculated from the captured images of the object of interest, e.g., the license plate of a vehicle, the text portion of an ID, or the like. An illustrative example of determining a Fisher vector representation for an image is described in above-mentioned U.S. application Ser. No. 12/890,789 to Sanchez, et al., the disclosure of which is incorporated herein by reference in its entirety. Therefore, let $X=\{x_t, t=1, \ldots, T\}$ be the set of local descriptors extracted from T patches of an image (or image region). It is assumed here that the generation process of X can be modeled by a (probabilistic) mixture model $u_\lambda$ with parameters $\lambda$. The features X can then be described by a gradient vector (see, e.g., Jaakkola, et al., "Exploiting generative models in discriminative classifiers," in NIPS (1999)):

$$G_\lambda^X = \nabla_\lambda f_\lambda(X) = \frac{1}{T}\nabla_\lambda (\log u_\lambda(X)), \tag{1}$$

where X denotes the local descriptors extracted from the image (or image region) and $f_\lambda(X)$ denotes a probability function parameterized by parameters $\lambda$. In the rightmost expression of Equation (1), the illustrative probability function $f_\lambda(X)=T^{-1} \log u_\lambda(X)$ is a log-likelihood composition of the mixture model $u_\lambda$. The gradient of the log-likelihood describes the contribution of the parameters to the generation process. The dimensionality of this vector depends only on the number of parameters in $\lambda$, but not on the number of patches T. A natural kernel on these gradients is:

$$K(X,Y)=G_\lambda^{X'}F_\lambda^{-1}G_\lambda^Y \tag{2},$$

where $F_\lambda$ is the Fisher information matrix of $u_\lambda$, and is given by:

$$F_\lambda = E_{x\sim u_\lambda}[\nabla_\lambda \log u_\lambda(x)\nabla_\lambda \log u_\lambda(x)'] \tag{3}.$$

As $F_\lambda$ is symmetric and positive definite, $F_\lambda^{-1}$ has a Cholesky decomposition $F_\lambda^{-1}=L_\lambda'L_\lambda$ and $K(X,Y)$ can be rewritten as a dot-product between normalized vectors $G_\lambda$ with:

$$G_\lambda^X = L_\lambda G_\lambda^X \qquad (4)$$

The vector $G_\lambda^X$ is referred to herein as the Fisher vector of the set of local descriptors X extracted from the image (or image region). Learning a kernel classifier using the kernel of Equation (2) is equivalent to learning a linear classifier on the Fisher vectors $G_\lambda^X$. Learning linear classifiers can be done efficiently.

In illustrative examples set forth herein, the mixture model $u_\lambda$ is selected to be a Gaussian mixture model (GMM). See, e.g., Perronnin, et al., "Fisher kernels on visual vocabularies for image categorization" in CVPR (2007) which is incorporated herein by reference in its entirety. Here $$u_\lambda = \sum_{i=1}^{N} \omega_i u_i(x)$$

and the parameters are $\lambda = \{\omega_i, \mu_i, \Sigma_i, i=1, \ldots, N\}$, where $\omega_i$, $\mu_i$, and $\Sigma_i$ are respectively the mixture weight, mean vector, and covariance matrix of the Gaussian $u_i$. It is assumed in the illustrative examples employing a GMM that the covariance matrices $\Sigma_i$ are diagonal and the thus corresponding variance vector is denoted as $\sigma_i^2$. The GMM $$u_\lambda = \sum_{i=1}^{N} \omega_i u_i(x)$$

is suitably trained on a training set of images using a suitable training algorithm such as maximum likelihood (ML) estimation. The trained GMM is intended to describe the content of any image within a range of interest (for example, any color photograph if the range of interest is color photographs; or, any image of a black and white document if the range of interest is black and white documents, or so forth). It is further assumed in these illustrative examples that the descriptor sets $x_t$ for the various image patches $t=1, \ldots, T$ are generated independently by the GMM $u_\lambda$, and therefore:

$$G_\lambda^X = \frac{1}{T} \sum_{t=1}^{T} \nabla_\lambda (\log u_\lambda(x_t)). \qquad (5)$$

The gradient is considered here with respect to the mean and standard deviation parameters (typically, the gradient with respect to the weight parameters provides little additional information). Use is made of the diagonal closed-form approximation (see e.g., Perronnin, et al., "Fisher kernels on visual vocabularies for image categorization" in CVPR (2007)), in which case the normalization of the gradient by $L_\lambda = F_\lambda^{-1/2}$ is effectively a whitening of the dimensions. Let $\gamma_t(i)$ be the soft assignment of descriptor $x_t$ to the Gaussian i according to:

$$\gamma_t(i) = \frac{\omega_i u_i(x_t)}{\sum_{j=1}^{N} \omega_j u_j(x_t)}. \qquad (6)$$

Let D denote the dimensionality of the descriptors $x_t$. Let $\mathcal{G}_{\mu,i}^X$ (resp. $\mathcal{G}_{\sigma,i}^X$) be the D-dimensional gradient with respect to the mean $\mu_i$ (resp. standard deviation $\sigma_i$) of the Gaussian component i. It can be shown that the following holds:

$$\mathcal{G}_{\mu,i}^X = \frac{1}{T\sqrt{\omega_i}} \sum_{t=1}^{T} \gamma_t(i) \left( \frac{x_t - \mu_i}{\sigma_i} \right) \qquad (7)$$

and $$\mathcal{G}_{\sigma,i}^X = \frac{1}{T\sqrt{2\omega_i}} \sum_{t=1}^{T} \gamma_t(i) \left[ \frac{(x_t - \mu_i)^2}{\sigma_i^2} - 1 \right], \qquad (8)$$

where the division between vectors is as a term-by-term operation. The final gradient vector $\mathcal{G}_\lambda^X$ is the concatenation of the $\mathcal{G}_{\mu,i}^X$ and $\mathcal{G}_{\sigma,i}^X$ vectors for $i=1, \ldots, N$ and is therefore 2ND-dimensional.

In embodiments employing image partitioning, a Fisher vector is generated for each image region in accordance with Equation (5). These Fisher vectors are then concatenated to generate the image vector. In this case the final image vector is 2NDR-dimensional, where R denotes the number of regions (e.g., R=4 in the illustrative example of four regions consisting of the total image and top, middle, and bottom regions). Advantageously, partitioning the image into regions retains spatial location information in the image, since (by way of illustrative example) if a dog is shown in a lower portion of the image then the Fisher vector for the lower image portion will particularly reflect descriptors of dog images. On the other hand, the image partitioning or region definition is optional, such that if image partitioning is not employed, then defining the region and the concatenation operation are both omitted during the generation of the Fisher vector representing the image.

It will be appreciated that the Fisher vector representing a given image may be substantially more compact than the image itself, where compactness or size is measured by the amount of memory or storage occupied by the vector or image. However, the vector can still be relatively large. By way of example, in some suitable embodiments: the GMM includes N=256 Gaussian components; the descriptors $x_t$ have dimensionality D=64; and partitioning is optionally employed with the number of image regions being R=4. If the Fisher vector of Equation (5) includes gradients computed for each Gaussian mean $\mu_i$ and for each Gaussian variance $\sigma_i$, but not for each Gaussian weight $\omega_i$, then the number of gradients P computed per Gaussian component is P=2D=128 gradients. In this case the Fisher vector has dimensionality E=N×P×R=256×128×4=131,072 dimensions. If four-byte floating point arithmetic is used to represent the dimensions, then the Fisher vector for the single image occupies 512 kilobytes which is one-half megabyte. Methods for reducing the dimensionality of the Fisher vector can be employed, as described in application Ser. No. 12/890,789.

Other methods for generation of a visual signature of the semantic content of an image which can be used herein are described, for example, in U.S. Pub. No. 2007005356, published Jan. 4, 2007, entitled GENERIC VISUAL CATEGORIZATION METHOD AND SYSTEM, by Florent Perronnin; U.S. Pub. No. 20070258648, published Nov. 8, 2007, entitled GENERIC VISUAL CLASSIFICATION WITH GRADIENT COMPONENTS-BASED DIMENSIONALITY ENHANCEMENT, by Florent Perronnin; U.S. Pub. No. 20080069456, published Mar. 20, 2008, entitled BAGS OF VISUAL CONTEXT-DEPENDENT WORDS FOR GENERIC VISUAL CATEGORIZATION, by Florent Perronnin; U.S. Pub. No. 20080317358, published Dec. 25, 2008, entitled CLASS-BASED IMAGE ENHANCEMENT SYSTEM, by Marco Bressan, et al.; U.S. Pub. No. 20090144033, published Jun. 4, 2009, entitled OBJECT COMPARISON, RETRIEVAL, AND CATEGORIZATION METHODS AND APPARATUSES, by Florent Perronnin, et al.; U.S. Pub. No. 20100040285, published Feb. 18, 2010, entitled SYSTEM AND METHOD FOR OBJECT CLASS LOCALIZATION AND SEMANTIC CLASS BASED IMAGE SEGMENTATION, by Gabriela Csurka, et al.; U.S. Pub. No. 20100092084, published Apr. 15, 2010, entitled REPRESENTING DOCUMENTS WITH RUNLENGTH HISTOGRAMS, by Florent Perronnin, et al.; U.S. Pub. No. 20100098343, published Apr. 22, 2010, entitled MODELING IMAGES AS MIXTURES OF IMAGE MODELS, by Florent Perronnin, et al.; U.S. Pub. No. 20100318477, published Dec. 16, 2010, entitled FAST AND EFFICIENT NON-LINEAR CLASSIFIER GENERATED FROM A TRAINED LINEAR CLASSIFIER, by Florent Perronnin, et al., U.S. Pub. No. 20110026831, published Feb. 3, 2011, entitled COMPACT SIGNATURE FOR UNORDERED VECTOR SETS WITH APPLICATION TO IMAGE RETRIEVAL, by Florent Perronnin, et al.; U.S. application Ser. No. 12/693, 795, filed Jan. 26, 2010, entitled A SYSTEM FOR CREATIVE IMAGE NAVIGATION AND EXPLORATION, by Sandra Skaff, et al.; U.S. application Ser. No. 12/960,018, filed Dec. 3, 2010, entitled LARGE-SCALE ASYMMETRIC COMPARISON COMPUTATION FOR BINARY EMBEDDINGS, by Albert Gordo, et al.; Perronnin, F., Dance, C., "Fisher Kernels on Visual Vocabularies for Image Categorization," in Proc. of the IEEE Conf on Computer Vision and Pattern Recognition (CVPR), Minneapolis, Minn., USA (June 2007); Yan-Tao Zheng, Ming Zhao, Yang Song, H. Adam, U. Buddemeier, A. Bissacco, F. Brucher, Tat-Seng Chua, and H. Neven, "Tour the World: Building a web-scale landmark recognition engine," IEEE Computer Society Conference, 2009; Herve Jegou, Matthijs Douze, and Cordelia Schmid, "Improving Bag-Of-Features for Large Scale Image Search," in IJCV, 2010; G. Csurka, C. Dance, L. Fan, J. Willamowski and C. Bray, "Visual Categorization with Bags of Keypoints," ECCV *Workshop on Statistical Learning in Computer Vision,* 2004; Herve Jegou, Matthijs Douze, and Cordelia Schmid, "Hamming embedding and weak geometric consistency for large scale image search," in ECCV 2008; Jorma Laaksonen, Markus Koskela, and Erkki Oja, "PicSOM self-organizing image retrieval with MPEG-7 content descriptions," IEEE Transactions on Neural Networks, vol. 13, no. 4, 2002, the disclosures of all of which are incorporated herein in their entireties by reference.

Figure 2:
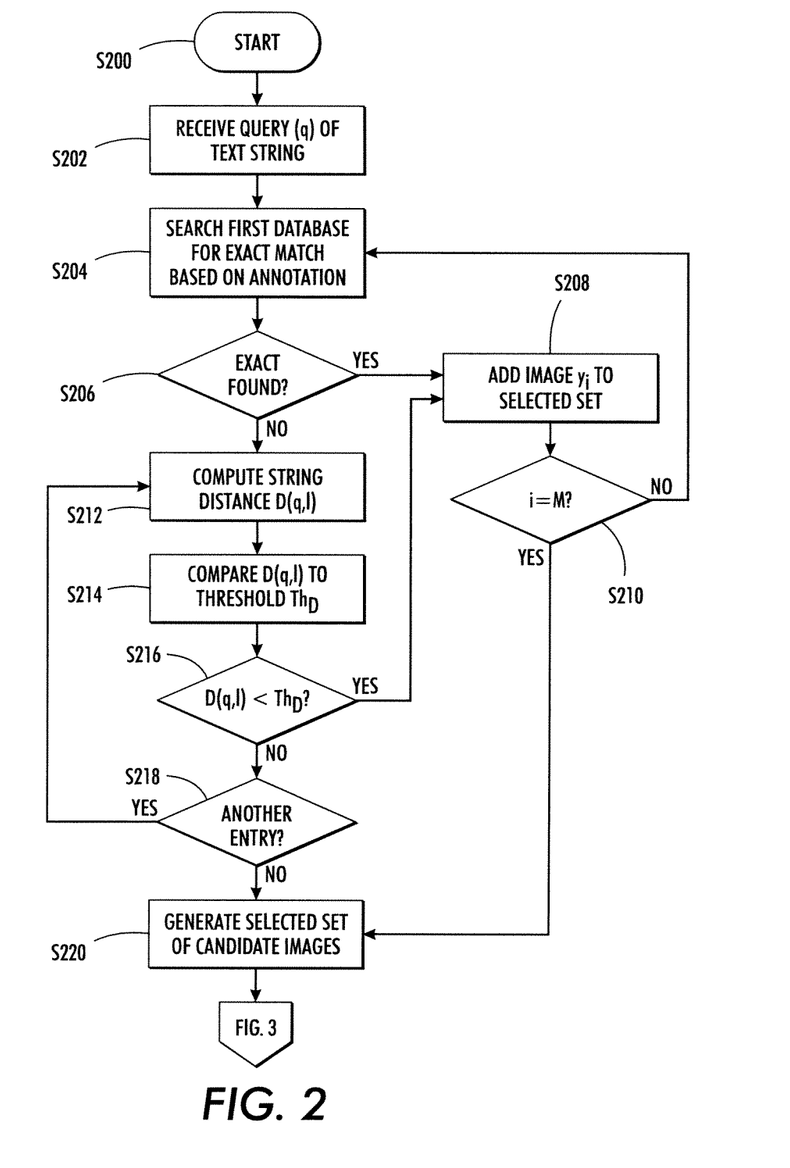
FIG. 2 is a flow chart which diagrammatically shows the operation of a method for text-based searching of image data.
Figure 3:
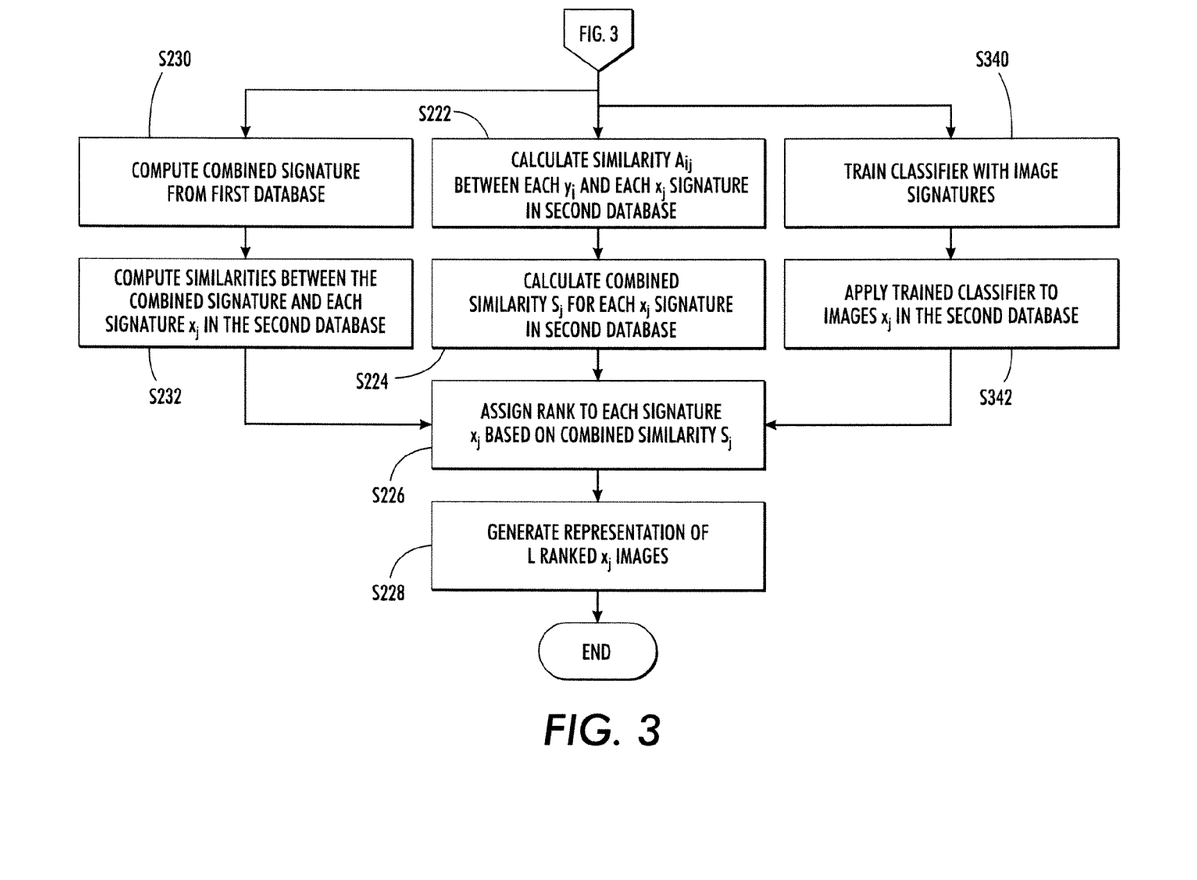
FIG. 3 diagrammatically shows continued operations in accordance with FIG. 2.

Turning now to FIGS. 2 and 3, there is shown a flow chart illustrating an exemplary method for text-based searching of image data in accordance with one embodiment. As will be appreciated, the steps of the method need not all proceed in the order illustrated and fewer, more, or different steps may be performed.

The method of FIG. 2 begins at S200. At S202, a query (q) is input. The query may be received from an associated user via any suitable input device 26, e.g., keyboard, touch screen, mouse, voice, or the like. It will be appreciated that such input is capable of being received by the computer system 12 or any other suitable computing device capable of interactions with multiple databases. According to one embodiment of the subject application, the query (q) includes a textual input, such as a sequence of characters including letters, numbers, symbols, or the like, e.g., drawn from the same set of characters as the annotations. As for the annotations, the sequence of characters may include at least two or three characters, and generally at least four or five characters, and in some cases up to 20 or 100 characters.

At S204, the computer system 12 searches the first database 30 for matches to the received query (q). That is, a search is performed through the first database 30 for those images having an annotation (l), e.g., a label, which exactly matches, or corresponds, to the input query (q). While reference is made herein to the computer system 12, other computing devices are also capable of implementation and use in accordance with the methods of FIGS. 2 and 3.

A determination is then made at step S206 whether an exact match to the query (q) has been located in the first database 30 by comparing the character string in the query with the annotations 42 stored in the database 30. When a positive identification is made at step S206 regarding the presence of an exact match in the first database 30, the image 40, or its visual signature 44 is added to a selected set of images 70 representative of image candidates that match the input query (q) at step S208. As used in this example embodiment, each candidate (selected) image from the first database 30 is designated as $y_i$, with i=1, 2, 3, . . . , M, with M being the number of selected images. The maximum number (M) of images in the selected set 70 can be selected in accordance with any desired maximum number of possible matches, in accordance with past operations, or the like.

At step S210, a determination is made whether the image (and/or associated visual signature) added to the selected set of candidates fulfills the maximum number M of the set. Upon a positive determination at step S210, operations proceed to step S220, whereupon the selected set 70 of candidate images/respective visual signatures, is generated for comparison with captured image data, as explained in greater detail below.

Returning to step S210, when it is determined that the maximum number of images in the selected set has not been filled, operations may return to step S204, whereupon the first database 30 is searched for an additional image that exactly matches the received query (q). Steps S204-S210 may be repeated until such time as a determination is made at step S206 that no exact matches are found, or at step S210 that the maximum number of images in the selected set has been reached, or that all annotations have been considered.

Thus, upon a determination at step S206 that no exact match between the query (q) and an image (and associated visual signature) in the first database 30 exists, operations proceed to step S212. At step S212, a string distance D(q,l) is computed for an entry in the first database 30. The string distance is a measure of similarity between first and second strings. In one embodiment, the string distance D is a Levenshtein (or edit) Distance. The Levenshtein distance between the input query (q) and the annotation (l) is the minimum number of edits needed to transform one variable into the other, with the allowable edit operations being insertion, deletion, or substitution of a single character, e.g., deleting a character, inserting a character, or substituting a character from the query (q) or the annotation (l) so that the two match. The characters are, of course, drawn from the same finite set of characters, e.g., letters and numbers in the case of license plates. Therefore, an exact match will have a string distance D of 0, wherein no substitutions, deletions, or additions are needed to render the query q and the annotation 44 the same. Accordingly, in one embodiment, step S206 can be bypassed by adjusting the threshold value ($Th_D$) to zero to establish exact matches in the first database 30. The calculated string distance D(q,l) may then be compared at step S214 to a threshold value ($Th_D$), e.g., a predetermined maximum number of edits. The threshold ($Th_D$) is capable of being selected in accordance with previously calculations, based upon predetermined variables, or as needed in accordance with one embodiment of the subject application.

At step S216, a determination may be made as to whether the distance D(q,l) for an entry is less than the threshold ($Th_D$). In one embodiment, $Th_D$ may be less than 0, e.g., less than 5, e.g., about 3. In general, the threshold $Th_D$ is at least 1, e.g., at least 2. When the distance D(q,l) is less than the threshold value ($Th_D$), the entry (image/visual signature) is added to the selected set at step S208, and operations proceed thereafter as previously discussed. When the distance D(q,l) is not less than that predetermined threshold value ($Th_D$), a determination is made whether any other entries remain in the first database 30 for analysis in accordance with the example implementation of FIG. 2.

Upon a positive determination at step S218, flow returns to step S212, whereupon the string distance D(q,l) of the next entry in the database 30 is calculated. Operations then proceed until a determination is made at step S210 that the maximum number (M) of images/signatures in the selected set has been met, or upon a determination at step S218 that no additional entries remain in the database 30 for comparison. Thereafter, operations proceed to step S220 for generation of the selected set 70 of images and/or associated visual signatures of the entries that either exactly match the received query (q) and/or that are similar to the query (q) based upon the distance D(q,l).

In other embodiments, rather than selecting entries with a string distance below a threshold, a set of M entries corresponding to the lowest string distances can simply be selected from the first database 30.

Other similarity measures for computing similarity between text strings can alternatively or additionally be used in S222. For example, a string kernel (also referred to as a "sequence kernel") can be computed. See, for example, U.S. Pub. No. 20090175545, U.S. Pat. No. 6,917,936, the disclosures of which are incorporated herein by reference in their entireties, and Huma Lodhi, Nello Cristianini, John Shawe-Taylor and Chris Watkins, in "Text Classification Using String Kernels," Advances in Neural Information Processing Systems 13, MIT Press, pp. 563-569, 2001. Generally, the string kernel is a similarity measure between two sequences of symbols over the same alphabet, where similarity is assessed as the number of occurrences of subsequences shared by two sequences of symbols; the more substrings in common, the greater the measure of similarity between the two sequences of symbols. One exemplary string kernel is a function which returns the dot product of feature vectors of two inputs strings. Feature vectors are defined in a vector space referred to as a feature space. The feature space of the string kernel is the space of all subsequences of length "n" characters in the input strings. For short strings, such as license plate numbers, however, the edit distance is a suitable similarity measure.

The method in FIG. 2 above, continues with FIG. 3, where images 46 are retrieved from the second database 32, based on their similarity to the images in set 70, e.g., by computing a visual measure of similarity between their respective image signatures.

In one embodiment, at step S222, a similarity $A_{ij}$ is calculated in accordance with the equation:

$$A_{ij}=K(x_j,y_i) \qquad (9),$$

for each signature ($y_i$) in the selected set 70 and each signature ($x_j$) in the second database 32, where K denotes a similarity between signatures. It will be appreciated that while a dot product is used herein, any suitable similarity measure suited to computing the similarity K can be used. For example, in the case of vectorial visual signatures, the Manhattan distance, KL divergence, the Hellinger (HE) divergence, the Renyi divergence, the Euclidean distance, the Mahalanobis distance, the L1 distance, or the chi-squared similarity measure can be used. See, for example, U.S. Pub. No. 20100191743, published Jul. 29, 2010, by Florent Perronnin, et al., the disclosure of which is incorporated herein by reference in its entirety, for further details on some of these distance measures. At step S224, a combined similarity $S_j$ for each signature $x_j$ in the second database 32 may be calculated based on the individual similarities $A_{ij}$ computed in S222. In accordance with one example embodiment, the combined similarity $S_j$ is computed as:

$$S_j=F(A_{1j}, \ldots, A_{Mj}) \qquad (10),$$

where F denotes a combination function. F can be for example, an average (such as a simple mean), a sum, or a product of the individual similarities, or the like. According to one example embodiment, the combination function F is a weighted average of the individual similarities which can be normalized over the sum of all the weights, such that:

$$S_j = \frac{\sum_{i=1}^{M} w_i A_{ij}}{\sum_{i=1}^{M} w_i}, \qquad (11)$$

As will be appreciated, selecting all the weights $w_i=1$ would reduce to the simple mean. According to one embodiment, a higher weight is assigned to individual similarities $A_{ij}$ of entries that are more similar with respect to the string (edit) distance. Thus, for example, each weight can be an inverse function or an exponential function of the respective edit distance, e.g.:

$$w_i=1/(a+D(q,y_i)) \qquad (12),$$

or $$w_i=\exp(-\lambda D(q,y_i)) \qquad (13).$$

It will be appreciated that (a) and ($\lambda$) are general parameters that are capable of being optimized using a separate validation, e.g., by a separate computation performed prior to searching for the query (q), a determination based upon scenario data associated with the query, a determination according to a subset of data in the first database 30, or the like. For example, the weight ($w_i$) is optimized during runtime by minimizing the distance D between the query string (q) as well as a representation of the annotation associated with each $y_i$, denoted as $l_i$. In such an example embodiment, selecting values of $w_i$'s that minimize the distance D between such representations can be computed as:

$$D\left(q, \frac{\sum_{i=1}^{M} w_i l_i}{\sum_{i=1}^{M} w_i}\right). \qquad (14)$$

Such an embodiment enables $w_i$ to vary amongst queries, such that each individual query (q) acquires an optimized weighted value, $w_i$ that is calculated on the fly.

In other embodiments, the same values of a and λ may be used for all queries. As an example, a=1 and λ=2.

According to another example embodiment, the similarities are expressed as continuous symmetric non-negative definite kernels, such as Mercer Kernels, i.e., of the form:

$$K(x,y)=\phi(x)\phi(y) \quad (15).$$

It will be appreciated that in accordance with Equation 15, the choice of the function K may be separated into a product of two identical functions, one function depending only on the variable x and the other function depending only on the variable y. It will further be appreciated that any suitable such functions are capable of being used in accordance with the embodiments of the subject application. In such an example embodiment, the combined similarity $S_j$ may be rewritten as:

$$S_j = \phi(x_j)\left(\frac{\sum_{i=1}^{M} w_i \phi(y_i)}{\sum_{i=1}^{M} w_i}\right). \quad (16)$$

In such calculations, the component of Equation 16 within the parenthesis is equivalent to a "combined signature" obtained by computing the weighted average of all the signatures. The combined similarity is then expressed as a similarity between the "combined signature" and each $\phi(x_j)$.

Equations 15 and 16 above provide the ability to first combine the signatures 44 of images 40 into one combined signature and then to compute one single similarity, instead of first computing signatures individually to obtain similarities and combining the results. That is, the example embodiment provides for scanning all the M image candidates from the first database 30 to compute the combined signature (S230) and then for scanning the N images from the second database 32 to compute the similarities between the combined signature and each signature of the second database 32 (S232). Thus the complexity is in the order of (M+N) type operations, rather than the (MN) operations, thereby providing a reduction in computational costs. As will be appreciated, in some embodiments, not every pair is automatically considered. For example, the user may put in a constraint, such a date or date range on which the image was captured, which limits the entries in database 32 which need to be considered.

In another embodiment, at S340 to compute the visual similarity measure, the visual signatures of the entries in the set 70 are fed to a classifier 80, and used to learn parameters of the classifier model. Any suitable classifier training method may be used, such as a linear or non-linear training algorithm. At S342, the trained classifier is used to classify the images in the database 32, based on their image signatures (i.e., to predict their similarity to images in the set 70). A responsive set of images can thus be identified.

In this embodiment, the system includes, e.g., in memory 18, a classifier 80 which is trained to retrieve images from the second database using visual signatures of images in the first database as training data. Discriminative classifier training can be implemented for text-based searching for an image without using optical character recognition. That is, instead of using the M signatures from the selected set 70 to query and then combining them, those selected M signatures are designated as "positives," while the remainder (or a subset) of the signatures in the first database 30 are designated as the "negatives," so as to learn a discriminative classifier. A suitable discrimination classification function is then applied for signatures from the second database 32, e.g., if the function output is greater than zero, the signature is a "positive," whereas if the function output is less than or equal to zero, the signature is "negative." Alternatively, rather than a binary classification, the classifier outputs a probability that the signature is representative of the set of images 70.

Returning to FIG. 3, at step S226, a set of entries 74 is retrieved, based on the combined visual similarities. For example, a rank may be assigned to each entry $x_j$ in the second database 32 based upon the combined similarity $S_j$ corresponding thereto. That is, the combined similarity $S_j$ associated with each entry $x_j$ in the second database 32 is used to determine the ranking of each individual entry amongst all entries in that second database 32, or to those entries for which the visual similarity measure exceeds a predetermined threshold. Alternatively, a group of the entries having the highest similarity is selected without performing any ranking. The set 74 of retrieved entries includes at least one image 48 and may include a plurality of images. In some embodiments, the set 74 may be permitted to be empty, e.g., when a threshold is set on the visual similarity measure.

Figure 5:
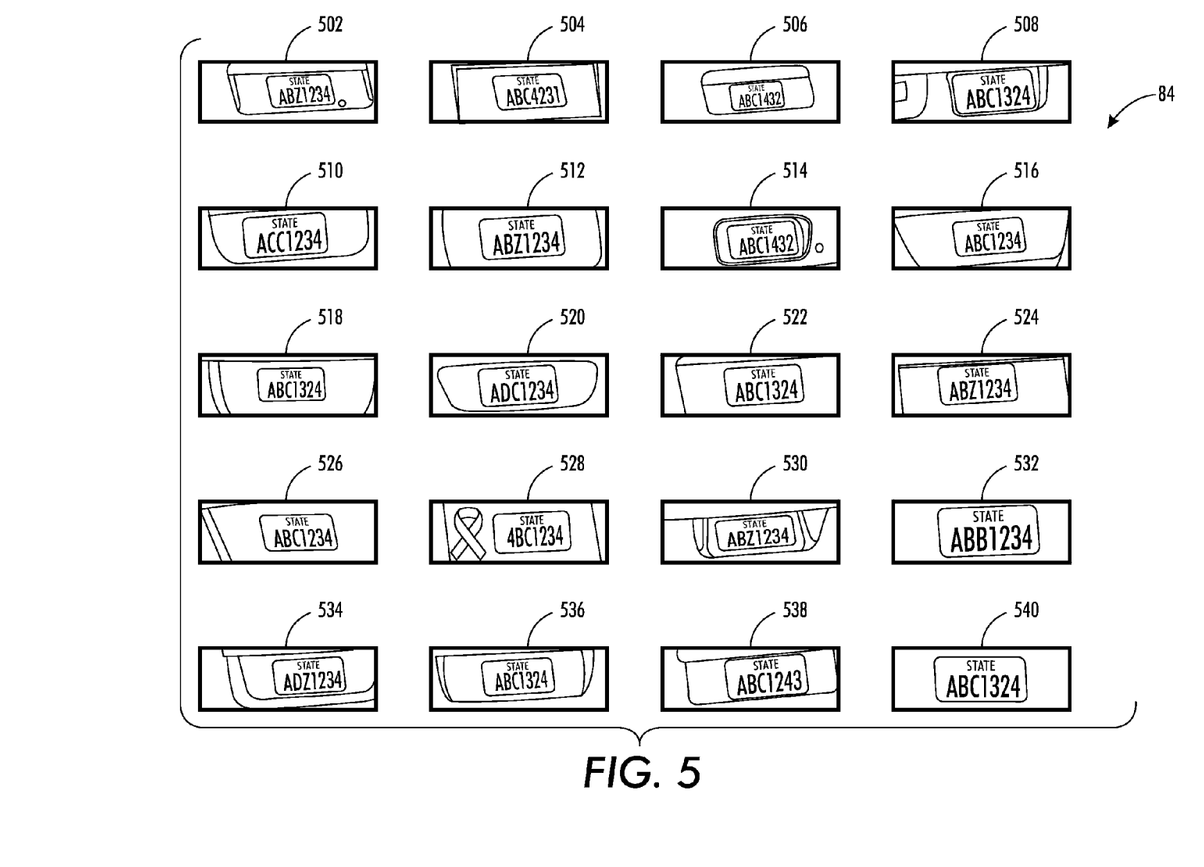
FIG. 5 illustrates an example output set in accordance with the experimental results.

At S228, information based on the set 74 of retrieved entries is output by the system. For example, a representation 84 is generated at step S228 of a group (L) of the entries $x_j$ from the second database 32, e.g., ordered by the assigned rank or arranged in any convenient format. The representation 84 may be the set of images arranged in an array. Such a representation is capable of being limited to a preselected number of most similar entries, e.g., L=10, 20, . . . 50. An example representation 84 of the highest 20, i.e., L=20, ranked images in the second database 32 responsive to the query (q) is illustrated in FIG. 5, which is discussed in greater detail below. In other embodiments, the information output at S228 may include a respective identifier of each the responsive images, allowing the images themselves to be retrieved from the database 32 at the client device.

When querying for an image, such as a license plate number, having exact matches in the annotated set, i.e., first database 30, the computer system 12 is automatically constructing a training set with examples of the searched class. In circumstances when querying for a license plate number that does not have an exact match in the first database, a subset of the most similar signatures will likely contain the signatures of the searched for license plate number. By combining multiple queries, the methodology allows for "voting" multiple times for the same subset, thus the signatures of the searched license plate number rank high.

Validation of the method can be demonstrated by the following equation:

$$x \cdot \frac{\sum_{i=1}^{M} w_i y_i}{\sum_{i=1}^{M} w_i} = x \cdot p + \frac{\sum_{i=1}^{M} w_i n_i}{\sum_{i=1}^{M} w_i}, \quad (17)$$

which illustrates the similarity between a candidate image x and the query (q). Equation 17 presumes that $y_i$ may be expressed as:

$$y_i = p + n_i \quad (18),$$

where, p represents the (unknown) "true" signature of the query, and $n_i$ is an additive noise which captures the differences between $y_i$ and p induced by (i) the license plate number being slightly different, and (ii) other usual noise sources such as camera noise, geometric variability, and the like. The foregoing illustrates that the second term (noise) in Equation 17 cancels out by averaging over a large number of $y_i$'s.

The method illustrated in FIGS. 2 and 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and 3, can be used to implement the exemplary retrieval method.

The exemplary system and method are applicable to other types of non-optical character recognition image searching, for example, a driving license, ID card, or the like. In such an application, the annotated first database 30 would store multiple entries, each of which would include an image of the scanned or photograph ID card, an annotation (driving license number, employee number, name, address, etc.), a visual signature, and any other collected information. Images would be captured by a security camera, which would then be stored in the second database 32, along with any other data collected at image capture, e.g., date/time, camera position, etc. The determination of whether the person associated with a given form of identification is present in a particular location could be ascertained via the process above.

In accordance with another embodiment, the method set forth herein is further adaptable to word image retrieval. That is, it can be used for locating a word in images of documents, without the performance of optical character recognition, e.g., a large database of scanned documents, where images are not conducive to optical character recognition (resolution, shading, other discrepancies), for which optical character recognition would take an exceedingly long time, and the like. For example, when a large collection of documents must be searched for certain keywords, images may be captured via any suitable means, and stored in the second database 32. In the exemplary method, the first database 30 contains various images of words, transcriptions, visual signatures, and other associated annotations corresponding to the words.

As with the preceding embodiments, a user may first conduct a search via the first database 30 for word images that correspond to the input query (q). Any suitable methods for localizing a word image in one of the scanned documents (in the second database 32) are capable of being used for segmentation of the documents, as set forth in greater detail above. The first database 30 is then searched for a selected set of images that meet a predetermined string (edit) distance threshold ($Th_D$) for the particular search being undertaken. The visual signatures of the selected set of images are then compared to the visual signatures of words in the documents of the second database 32 in accordance with the methods set forth above, so as to output a set of documents which include the queried word. The display generated regarding the highest ranked documents may include the pages of the document in which the word appears, the entire document itself, a portion of the document containing the word, or the like.

Without intending to limit the scope of the exemplary embodiment, the following examples illustrate the applicability of the system and method.

EXAMPLES

Figure 4:
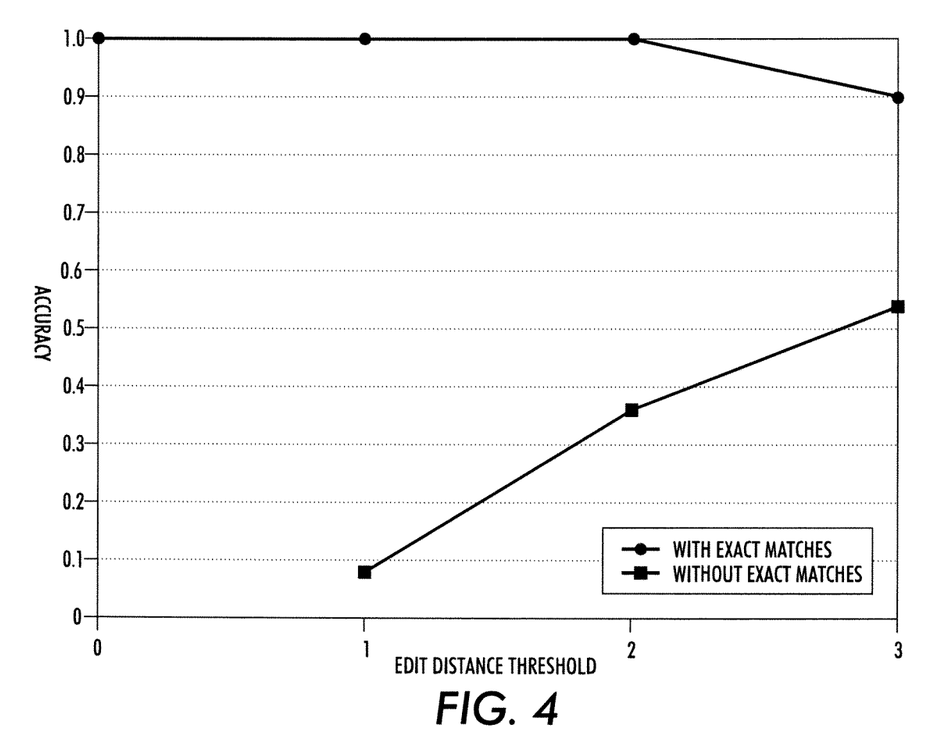
FIG. 4 shows plots of experimental results.

FIGS. 4 and 5 illustrate various experimental results and validations in operations for locating license plate numbers in application of the methods of FIGS. 2-3. It is to be appreciated that the application to license plate recognition is intended as an example and that the method is further adaptable to other image recognition environments.

The experimental results discussed below are shown for a dataset of license plate images collected from tolling plazas, e.g., toll booths. The number of images/entries in each set described below are representative samplings, and the systems and methods described herein are applicable to larger and smaller data sets, as appropriate to the particular implementation. Front and rear images of vehicles are captured, after which image segmentation is performed on the images to extract the license plate region 40 of the vehicles. The annotated data set used herein corresponds to data from a tolling management system, such that the data is reviewed and license plate annotations for captured images are manually applied, e.g., forming the annotated database. According to various embodiments of the subject application, a subsequent data set, e.g., second database, does not have associated annotations. However, for purposes of the examples set forth in FIGS. 4 and 5, for verification purposes, the subsequent data set includes annotations, wherein such annotations are used to validate the consistency of the results set forth below.

Accordingly, week 1 including 36,544 license plate images (and corresponding annotations) is designated as the annotated set (the first database), while week 3 including 34,597 license plate images (without annotations) is designated as the second data set (the second database). For all images, in both week 1 and week 3, their respective Fisher vectors (visual signatures) are computed and stored.

A random selection of 5000 queries from the labels in week 3 is selected. For each of the randomly selected queries, the method set forth above with respect to FIGS. 2 and 3 is performed, with a final score (combined similarity) $S_j$ being assigned to each image of week 3. A query is deemed successful if at least one image with the same license plate number as the query is in the highest ranked group of 20. The accuracy is thus measured as the number of successful queries divided by the total number of queries.

The overall system accuracy is set forth in Table 1:

TABLE 1

| | | |
|---|---|---|
| Overall accuracy | 67.7% | (3384/5000) |
| Queries with exact matches | 99.2% | (1197/1207) |
| Queries without exact matches | 57.7% | (2187/3793) |

Table 1 illustrates the overall system accuracy for results obtained with a string (edit) distance threshold of 3 ($Th_D$=3), and using the weighted distance with exponential weights as the combination function F. As shown, the system is successful in about 68% of the queries. In order to gain an insight from these results, the analysis is split into (i) queries with exact matches in the annotated set (1207 out of 5000) and (ii) queries without any exact matches (2187).

With respect to those queries with exact matches, in order to ascertain whether the result is significant, the result is compared to a content-based image retrieval situation, i.e., a system where an image example of the license plate number being queried is provided. The foregoing can be accomplished by selecting a random positive example from the annotated set and using this example as the query, for each sample with an exact match. The preceding experiment is repeated at least 20 times to average results. In that case, an average of 1157.1 successful queries (with a standard deviation of 4.9) out of 1207 is obtained, which corresponds to an accuracy of 95.9%, to be compared with the previously obtained 99.2%. The results demonstrate that the combination of the selected queries can help in these circumstances.

With respect to those queries without any exact matches, the system is successful in about 58% of the times. Such results can be very useful, because in the absence of optical character recognition, it would not be possible to query for this type of sample. Using retrieval techniques, e.g., finding the best match, works for license plate numbers for which there are available images in the first database. The subject application, as will be appreciated, thereby provides a suitable method wherein a match can be established even with respect to a license plate number that was not in the database. That is, any method where a classifier is learned from the annotated first database 30 would obtain zero accuracy in this set, i.e., a chance accuracy which is non-zero but very close to zero.

The effect of the choice of weights is set forth in Table 2:

TABLE 2

| Weights | Accuracy at top 20 |
|---|---|
| $w_i = 1$ | 66.0% |
| $w_i = 1/(a + D(q, y_i))$ | 66.8% |
| $w_i = \exp(-\lambda D(q, y_i))$ | 67.7% |

Table 2 illustrates the accuracy of the system as a function of the choice of weights. That is, the three options discussed above with respect to Equations 12 and 13 reflect several optional weight choices which can be used.

Good results can be obtained by weighting the selected samples with a value that is exponentially decreasing with respect to the string (edit) distance between the corresponding license plate number and the query. The parameters a and λ were optimized on a separate validation set, which is dependent upon the data sets queried, e.g., in the present experiment, a=1, λ=2.

With reference to FIG. 4, experimental results of string (edit) distance threshold values ($Th_D$) are plotted along the graph 400. That is, FIG. 4 depicts the evolution of the accuracy as a function of the string (edit) distance threshold $Th_D$ chosen to build the selected set of visual signatures, using a validation set of 500 queries. As discussed above, distinguishing the results is accomplished by the presence or absence of exact matches in the annotated set.

The plotted results 400 justify a selection of $Th_D$=0 as the threshold for exact matches. As discussed above, such a threshold setting indicates that no substitutions, deletions, or additions are necessary to render the query and the license plate number the same. The value of 0 is illustrated in the instant example for reducing the number of signatures selected from a training set so that computing combinations is faster. Larger values of $Th_D$ may present a comparable performance.

FIG. 4 demonstrates that a selected threshold distance $Th_D$=3 for non-exact matches is highly accurate amongst the values evaluated, while maintaining a reduced computational cost. It will be apparent higher values of $Th_D$ for non-exact matches may present comparable or even better results.

Turning now to FIG. 5, there is shown an example output of the 20 highest ranked license plate "images" for the corresponding textual query indicated. It will be appreciated that the depictions of license plates illustrated in FIG. 5 are representative in nature of the license plate photographs ("images") that may be returned in accordance with one embodiment of the subject application. For purposes of this example, it is presumed that law enforcement or parking enforcement wishes to ascertain whether a particular vehicle has entered/exited a location. The location includes an image capture system that is configured to collect images of vehicles entering/exiting, including time/stamp, and the like. This collected information, absent any human interaction, is then stored in the second database 32.

In FIG. 5, correct matches are indicated with an "x". That is, using the textual input, an associated user queries for license plate number ABC1234 in the state of "STATE", such that the query: {LP="ABC1234," state="STATE"}. In accordance with the example embodiments discussed herein, the query (q) is input via the computer system 12. The first database 30 is then queried in accordance with the textual input string. Exact matches are first sought between the input query and the annotations associated with one or more of the entries in the first database 30. For example purposes, reference is made hereafter as calculating the distance threshold ($Th_D$) for all entries. A direct matching between the annotation in the first database and the text query is also capable of producing exact matches. Thus, the query is made for all entries in the first database 30 that have a calculated distance D(q,l) below the threshold value ($Th_D$=3).

Once the computer system 12 has ascertained this annotated set of images, a similarity is computed for each entry in a second database 32 with each entry of the annotated set. That is, the visual signature, e.g., Fisher vector, associated with each entry in the second database 32 is compared with the visual signature of each entry in the annotated set from the first database 30. This similarity value for each comparison is then combined so as to provide a combined similarity score. That is, entry $x_1$ in the second database 32 is compared to entries $y_1$ through $y_i$ in the annotated set, resulting in similarity values $A_{1l}$ through $A_{1i}$. Those values $A_{1l}$ through $A_{1i}$ are combined so as to provide a combined similarity score $S_1$ for the second database entry $x_1$. This process, as set forth above, is repeated for $x_2$ through $x_j$ entries in the second database 32, resulting in combined similarity scores of $S_2$ through $S_j$.

The images in the second database 32 are then ordered based upon their similarity scores $S_1$-$S_j$, with the highest ranked images 502-540 output and displayed to the requesting user via the display device 24 of the user's client computing device. The example of FIG. 5 provides two exact matches (516 and 526), indicating that the vehicle associated with the queried license plate number "ABC1234" was photographed on at least two occasions. Thereafter, the user is able to ascertain additional information related to the images based upon data in the second database 32 collected at image capture.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for text-based searching of image data comprising:
   with a computer processor, computing a measure of string similarity between a query and an annotation associated with each of a plurality of entries in a first database, the string similarity measure corresponding to a number of edits to at least one of the query or annotation;
   based on the computed string similarity measures, selecting a set of the entries from the associated first database, a visual signature being associated with each entry;
   retrieving at least one entry from a second database, based on a measure of visual similarity between a visual signature of each of a plurality of entries in the second database and the visual signatures of the entries in the selected set; and
   generating information corresponding to the least one of the retrieved entries.

2. The method of claim 1, wherein the retrieving entries comprises comparing a visual signature of each of the plurality of entries in the second database to the visual signature of each of the selected set so as to determine a similarity therebetween.

3. The method of claim 2, wherein the retrieving comprises ranking entries in the second database based on the similarity of the visual signatures and selecting a subset of ranked entries from the second database, and wherein the information corresponds to the selected subset of ranked entries.

4. The method of claim 1, wherein the retrieving entries comprises:
   calculating a combined similarity for each of the plurality of entries in the second database based on the computed measures of visual similarity; and
   retrieving entries from the second database based on the combined similarity associated therewith.

5. The method of claim 4, wherein calculating a combined similarity comprises combining, for each entry in the second database, each calculated similarity between the entry in the second database and the selected set.

6. The method of claim 4, wherein calculating a combined similarity comprises computing a combination function that is a weighted average of the individual similarities.

7. The method of claim 6, further comprising calculating a weight during calculation of the combined similarity in accordance with a distance between the query and an annotation of each entry in the associated first database.

8. The method of claim 1, wherein each visual signature is a representation of an image corresponding to a respective entry in one of the first and second databases.

9. The method of claim 8, wherein each visual signature is a vectorial representation describing a distribution of local features extracted from patches of the image.

10. The method of claim 1, further comprising:
    calculating a combined signature corresponding to an optionally weighted average of each visual signature of the selected set of entries from the first database; and
    wherein the computing of the measure of similarity between a visual signature of each of a plurality of entries in a second database and the visual signatures of the entries in the selected set comprises combining, for each entry in the second database, the combined signature of the selected set of entries and the entry in the second database.

11. The method of claim 1, wherein the query comprises a character string, each character in the string being drawn from a finite set of characters and the annotations comprise character strings, each character in the string being drawn from the same finite set of characters.

12. The method of claim 1, wherein the first and second databases comprise license plate data, and wherein the query comprises at least one of a license plate number and a state.

13. The method of claim 1, wherein the retrieving at least one entry from a second database comprises training a classifier with the visual signatures of the selected set of entries from the first database and applying the trained classifier to the visual signatures of the entries in the second database to identify a subset of entries in the second database.

14. The method of claim 1, wherein the selecting of the set of the entries from the first database comprises selecting entries each having a string distance between the query and the annotation associated with the entry which is below a predetermined threshold.

15. A system for text-based image searching comprising memory which stores instructions for performing the method of claim 1 and a processor in communication with the memory for executing the instructions.

16. A computer program product comprising a non-transitory recording medium storing instructions, which when executed on a computer causes the computer to perform the method of claim 1.

17. A text-based image searching system, comprising:
    a processor with access to associated memory, the associated memory storing:
        a first associated database comprising a plurality of annotated entries, each entry having a visual signature and annotation associated therewith, and
        a second associated database comprising a plurality of entries, each entry having a visual signature associated therewith;
    memory in communication with the processor, which stores instructions which are executed by the processor for:
        receiving a query which comprises a character string,
        computing a string similarity measure between the query character string and an annotation associated with each of a plurality of entries in the first database, the string similarity measure corresponding to a number of edits to transform at least one of the query or annotation into the other,
        based on the computed string similarity measures, selecting a set of the entries from the associated first database, a visual signature being associated with each entry,
        retrieving at least one entry from a second database, based on a computed visual similarity measure which is based on visual signatures of each of a plurality of entries in the second database and the visual signatures of the entries in the selected set from the associated first database, and
        outputting information corresponding to the least one of the retrieved entries.

18. The system of claim 17, further comprising a classifier which is trained on the visual signatures of the plurality of entries to retrieve entries in the second database based on their visual signatures.

19. The system of claim 17, wherein the associated first and second databases comprise at least one of license plate data and driving license data.

20. A method for text-based searching of image data comprising:

receiving a query into memory, the query comprising a character string, each of the characters in the string being selected form a finite set of characters;

with a computer processor, calculating a string similarity measure between the character string of the query and an annotation associated with each of a plurality of visual signatures of captured images stored in a first database, the annotation comprising a character string, each of the characters in the string being selected from the finite set of characters;

selecting a first set of visual signatures from the plurality of visual signatures in the first database based on the computed string similarity measures, the computed string similarity measures corresponding to a number of edits to at least one of the query or annotation;

retrieving a set of images from a second database based on a computed measure of similarity between the visual signatures in the first set of visual signatures and visual signatures of images in the second database.

21. The method of claim 20, further comprising, generating a representation of the retrieved images for display to a user on an associated user interface.

22. The method of claim 20, further comprising calculating a weight in accordance with a distance between the query and an annotation of each entry in the first database, wherein the retrieving the set of images from the second database is also based on the computed weights.

23. The method of claim 20, wherein the first and second databases comprise at least one of license plate images and driving license images.

24. The method of claim 20, wherein the query corresponds to a text string present in an image.

* * * * *